No. 794,202. PATENTED JULY 11, 1905.
C. M. TIPTON.
SPRING WHEEL.
APPLICATION FILED FEB. 21, 1905.
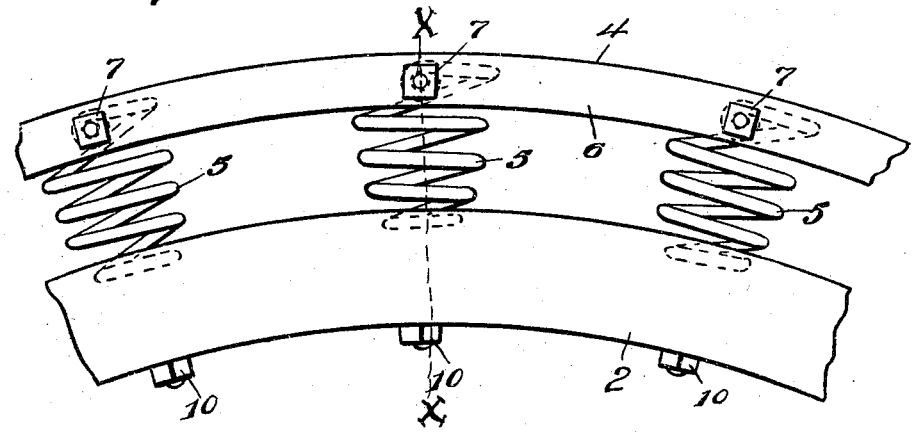
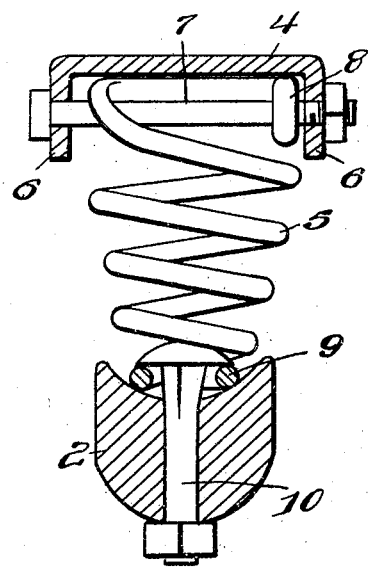
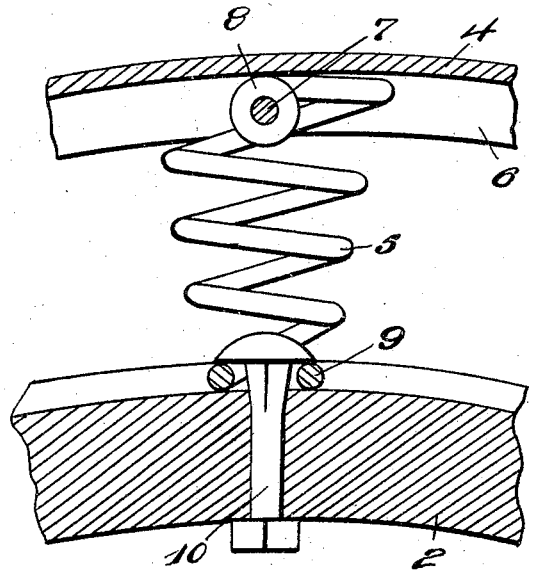
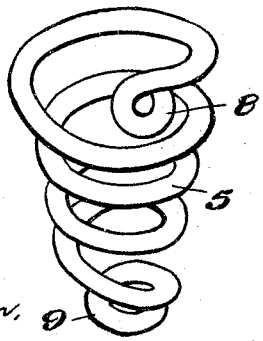
Witnesses
Inventor
C. M. Tipton
By R. A. P. Racey, Attorneys No. 794,202. Patented July 11, 1905.

UNITED STATES PATENT OFFICE.

CHARLES M. TIPTON, OF RAPIDAN, VIRGINIA.

SPRING-WHEEL.

SPECIFICATION forming part of Letters Patent No. 794,202, dated July 11, 1905.

Application filed February 21, 1905. Serial No. 246,758.

*To all whom it may concern:*

Be it known that I, CHARLES M. TIPTON, a citizen of the United States, residing at Rapidan, in the county of Culpeper and State of Virginia, have invented certain new and useful Improvements in Spring-Wheels, of which the following is a specification.

This invention has relation to vehicle-wheels of the type provided with yieldable tires, so as to neutralize shock and vibration, and aims to provide novel connecting means between the rim, tire, and interposed coil-springs.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a view in elevation of a portion of a wheel embodying the invention, parts of the rim and tire being broken away. Fig. 2 is a transverse section of the tire and rim on the line $x$ $x$ of Fig. 1, showing the parts on a larger scale. Fig. 3 is a longitudinal section of the parts shown in Fig. 2. Fig. 4 is a detail perspective view of one of the coil-springs.

Corresponding and like parts are referred to in the following description and indicated in all the views of the drawings by the same reference characters.

In general structure the wheel is of ordinary appearance and comprises a rim 2 and tire 4. In accordance with this invention the tire 4 is of larger diameter than the rim 2 to provide a space for reception of a series of coil-springs 5, which are connected at their ends to respectively the tire and rim. The tire 4 is approximately of U form in transverse section, so as to receive the outer ends of the coil-springs, which are confined between the longitudinal flanges 6 of the tire. Bolts or pins 7 connect the flanges 6 to prevent spreading thereof and pass through eyes 8 at the outer ends of the coil-springs, so as to prevent movement thereof in the circumferential length of the tire. The outer volute of each coil-spring is confined between the tire and the bolts or pins 7, as shown most clearly in Figs 2 and 3. The inner ends of the coil-springs are formed with eyes 9, through which pass bolts or like fastenings 10 for confining said portions to the rim 2, the latter being provided with openings to receive the said bolts or fastenings. The eyes 9 are completely formed and arranged so as to obtain a square bearing upon the rim 2 and prevent any tilting of the springs when in place. The rim 2 is grooved in its outer side to form a seat for reception of the inner ends of the springs, said inner ends being contracted to snugly fit the groove or channel thereof.

The coil-springs 5 may be constructed of wire of suitable gage and provided in sufficient number according to the load required to be supported by the wheel. It is noted that the bolts or pins 7 serve to brace the tire transversely and to prevent displacement of the outer ends of the springs both in a circumferential and in a radial direction.

Having thus described the invention, what is claimed as new is—

In a spring-wheel, the combination of a rim, a tire spaced therefrom and having inner longitudinal flanges, coil-springs interposed between the rim and tire and having eyes at their inner ends seated squarely against the rim, and having eyes at their outer ends parallel with the axes of the springs and at right angles to the eyes at the inner ends of the springs, radial fastenings connecting the inner ends of the springs to the rim, and transverse fastenings connecting the outer volutes of the springs between them and the tire and passed through the said longitudinal flanges and the outer eyes, substantially as specified.

In testimony whereof I affix my signature in presence of two witnesses.

CHARLES M. TIPTON. [L. S.]

Witnesses:
JOHN STROTHER COMPTON,
L. WISE JENNINGS.